United States Patent [19]
Patel

[11] Patent Number: 5,416,780
[45] Date of Patent: May 16, 1995

[54] TELECOMMUNICATIONS SYSTEM AND PROTOCOL FOR AVOIDING MESSAGE COLLISIONS ON A MULTIPLEXED COMMUNICATIONS LINK

[75] Inventor: Rajendra Patel, Plano, Tex.

[73] Assignee: Network Access Corporation, Richardson, Tex.

[21] Appl. No.: 869,518

[22] Filed: Apr. 16, 1992

Related U.S. Application Data

[63] Continuation-in-part of Ser. No. 723,169, Jun. 28, 1991, Pat. No. 5,315,636.

[51] Int. Cl.⁶ .............................................. H04J 3/16
[52] U.S. Cl. ................... 370/95.3; 370/85.13; 370/95.1; 379/58; 379/201; 379/210
[58] Field of Search ............... 370/95.3, 85.2, 85.3, 370/85.8, 85.13, 85.14, 95.1, 54, 16; 379/58, 59, 201, 210, 212; 371/32, 33

[56] References Cited

U.S. PATENT DOCUMENTS

| | | | |
|---|---|---|---|
| 4,414,661 | 11/1983 | Karlstom | 370/95 |
| 4,506,361 | 3/1985 | Kume | 370/85.2 |
| 4,638,479 | 1/1987 | Alexis | 370/95 |
| 4,811,421 | 3/1989 | Havel et al. | 455/69 |
| 4,947,390 | 8/1990 | Sheehy | 370/85.13 |
| 5,058,105 | 10/1991 | Mansour et al. | 370/16 |
| 5,101,407 | 3/1992 | Harvey et al. | 370/95.1 |
| 5,111,423 | 5/1992 | Shepherd et al. | 370/95.1 |
| 5,140,626 | 8/1992 | Ory et al. | 379/201 |
| 5,142,533 | 8/1992 | Crisler et al. | 370/85.2 |
| 5,142,534 | 8/1992 | Simpson et al. | 370/95.1 |
| 5,151,897 | 9/1992 | Suzuki | 370/85.13 |
| 5,166,929 | 11/1992 | Lo | 370/95.3 |
| 5,224,105 | 6/1993 | Higley | 371/33 |
| 5,271,058 | 12/1993 | Andrews et al. | 379/210 |

*Primary Examiner*—Douglas W. Olms
*Assistant Examiner*—Shick Hom
*Attorney, Agent, or Firm*—Harold E. Meier

[57] ABSTRACT

A location independent personal telecommunications system is presented that utilizes an out-of-band bi-directional burst data communications network to assist in the routing of personal communications via an in-band voice and data communications network. Access to the out-of-band network for communication is regulated by a multiple access communications protocol. Each user is synchronized with the other users of the network to the protocol and will access the network only during certain time periods that are reserved by the protocol for message traffic between network users. A collision avoidance scheme is included in the protocol to resolve instances of simultaneous transmission of message traffic by multiple users during the same time period.

19 Claims, 8 Drawing Sheets

TELECOMMUNICATIONS SYSTEM AND PROTOCOL FOR AVOIDING MESSAGE COLLISIONS ON A MULTIPLEXED COMMUNICATIONS LINK

RELATED APPLICATION

This application is a continuation-in-part of commonly assigned U.S. application for patent Ser. No. 07/723,169 filed Jun. 28, 1991 and now U.S. Pat. No. 5,315,636.

TECHNICAL FIELD

The present invention relates to communications systems, and in particular to a personal telecommunications system including an in-band voice and data communications network and an out-of-band bi-directional burst communications network employing a multiple access communications protocol.

BACKGROUND OF THE INVENTION

Burst communications messages are characterized by short length message transmissions conveying a predetermined amount of data. A uni-directional data link for implementing burst communications is well known in the art. A bi-directional burst communications data link between a plurality of users, however, has historically been too complex to implement in a practical and cost effective manner because such a data link requires precise timing between the plurality of users transmitting data messages and message acknowledgements. The timing problems are magnified as the number of users requesting access to the data link increases. Without sufficient timing synchronization and safeguards in the communications protocol, it is difficult to avoid simultaneous burst message transmission by multiple users resulting in signal interference on the data link and user confusion due to lost or uncompleted message transmissions. Accordingly, there is a need for a communications protocol to manage and control user access to a data link for bi-directional burst communications.

SUMMARY OF THE INVENTION

The present invention comprises a location independent personal telecommunications system that utilizes an out-of-band bi-directional burst data communications network to manage and control an in-band voice and data communications network. The out-of-band data communications network comprises a plurality of network users communicating with each other via a data link. Each user is synchronized with the other users of the network to internally keep track of time periods in a repeating time frame of a multiple access communications protocol wherein certain time periods are reserved for message traffic between network users, but are not individually dedicated for use by any specific user. At certain time periods identified by a user through monitoring of the internal tracking of the protocol time periods, users will access the data link for transmission and reception of data messages. Due to the large number of network users with access to the data link, considerable competition for an individual time period for communications transmissions is inevitable. Accordingly, a collision avoidance scheme is included in the protocol to resolve instances of simultaneous transmission of message traffic by multiple users during the same time period within a frame. With the collision avoidance scheme, the user will retransmit the data message at one or more fixed and random time periods in the future to avoid instances of simultaneous transmission.

BRIEF DESCRIPTION OF THE DRAWINGS

A more complete understanding of the multiple access communications protocol employed by the bi-directional burst communications network of the present invention may be had by reference to the following Detailed Description when taken in conjunction with the accompanying Drawings wherein.

DETAILED DESCRIPTION OF THE DRAWINGS

Figure 1:
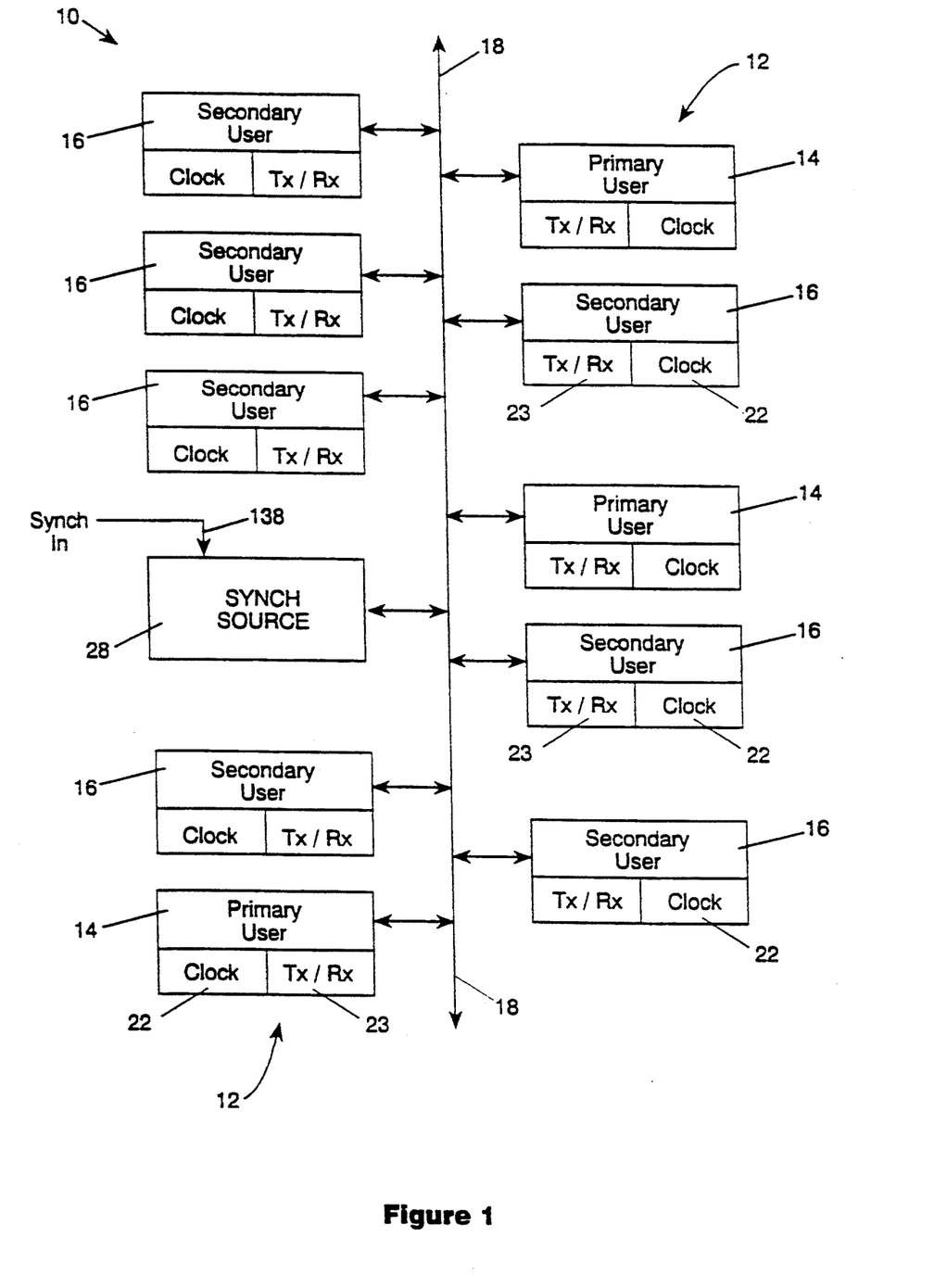
FIG. 1 is a block diagram for an out-of-band bi-directional burst data communications network.

Reference is now made to FIG. 1 wherein there is shown a schematic block diagram for a bi-directional burst data communications network 10 of the present invention for effectuating bi-directional burst communications between a plurality of users 12. The plurality of users comprise both primary users 14 and secondary users 16. The use of the designation "primary" or "secondary" relates to the amount of communications traffic initiated by the user 12 on the network 10, with primary users 14 more likely than secondary users 16 to initiate burst communications on the network. The designation does not necessarily have any relation to the actual number of users of that particular type who have access to the network 10. It will not be unusual if, as illustrated in FIG. 1, there are more secondary users 16 on the network 10 than primary users 14.

Bi-directional burst communications between users 12 using the communications network 10 occur on a data link 18 with the times when users are authorized to access the data link to initiate and/or receive data communications controlled by a multiple access communications protocol to be described that also resolves instances of simultaneous access to the data link for burst message transmission by multiple users. The data link 18 is preferably a radio frequency channel (i.e., a carrier at a single radio frequency, modulated by user 12 data messages) although it will, of course, be understood that the communications protocol may be implemented to control the times of user access to a hardwire channel as well. For the preferred radio frequency data link 18, the channel may have a band width as small as 25 KHz to most efficiently use the currently available portions of the RF spectrum. Data communication may be effectuated on the channel at a rate of 4800 bits/second.

Figure 2A:
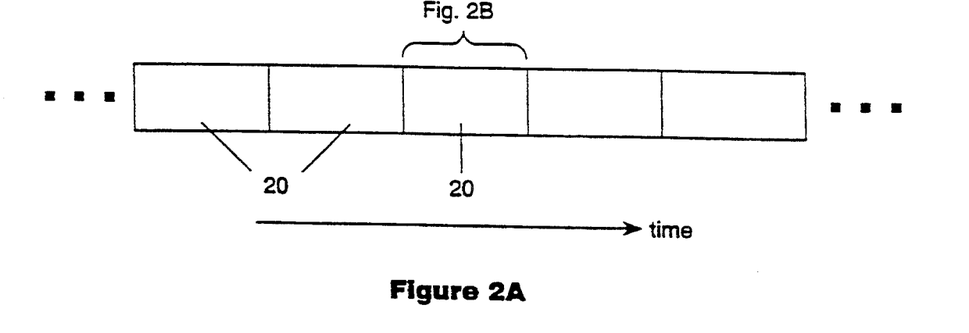
FIG. 2A illustrates the repeating time frames of a multiple access communications protocol.
Figure 2B:
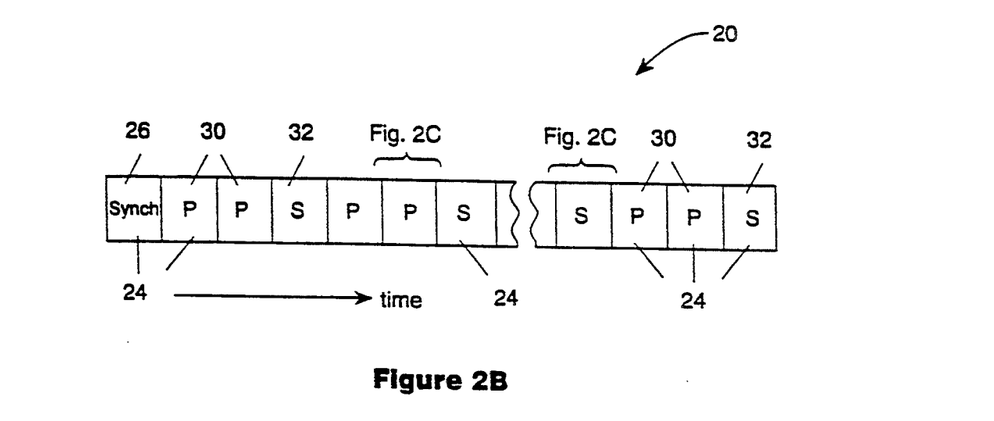
FIG. 2B illustrates one time frame of the communications protocol.

Referring now to FIGS. 2A, 2B, 2C, 3A and 3B there is illustrated in FIG. 2A the repeating time frames 20 of a multiple access communications protocol generated for the network 10 and employed to establish a network-wide timing scheme (step 21, FIG. 3A) that will identify certain times when users 12 are authorized to access the data link 18 to initiate and/or receive data communications. A single time frame 20 of the multiple access communications protocol is shown in FIG. 2B. Each time frame 20 is comprised of a plurality of time periods 24. One time period 24 per frame 20 (the "synch" period 26) is provided for the broadcasting of a synchronization message on the data link 18 from a synch source 28 (FIG. 1) addressed to the users 12 of the communications network 10 (step 25, FIG. 3A). The broadcast during synch period 26 synchronizes each user 12 in a manner to be described to the protocol and the repeating frames 20 and time periods 24 therein so that the users may identify those time periods when access to the data link 18 is authorized. In the preferred embodiment, the synch source 28 will comprise one or more users 12 (either primary or secondary, 14 or 16, respectively) of the network 10. The remaining time periods 24 within each time frame 20 are divided into primary ("P") time periods 30 and secondary ("S") time periods 32 that are reserved for certain network users 12 to access the data link 18 and initiate burst message transmissions on the network 10 and for certain other users to receive and acknowledge those message transmissions.

The time periods 24 within each time frame 20 in the protocol, however, are not assigned to or dedicated for use by a specific user 12. Each primary time period 30 may be taken by any primary user 14 to access the data link 18 and transmit a burst data communication on the network 10 addressed to other primary users or any secondary user 16 (i.e., an intended recipient user). Thus, each primary and secondary user, 14 and 16, respectively, may access the data link 18 during each primary time period 30 and listen for data transmissions initiated by a primary user for which the user is an intended recipient. Data transmissions on the network 10 are received by each user accessing the data link 18 during the transmission time period but are ignored by all users except for the intended recipient. Similarly, each secondary time period 32 may be taken by any secondary user 16 to access the data link 18 and initiate a burst communications transmission on the network 10. The allocation of two primary time periods 30 for every secondary time period 32 in the frame 20 by the multiple access communications protocol is due to the anticipated nature of the bi-directional burst communications traffic on the network 10 wherein the primary users 14 are expected to initiate more burst communications than secondary users 16.

As discussed previously, once every frame 20 a synchronization message is transmitted by the synch source 28 on the data link 18 during synch time period 26. The synchronization message is received by each user 12 (accessing the data link during the synch time period 26) to initiate an internal clock 22 utilized by each user to keep track of the timing of the communications protocol. The synchronization message synchronizes the plurality of users to the time periods within each time frame of the communications protocol. Each user 12, by means of the internal clock 22, will monitor the timing of the protocol (step 27, FIG. 3A) to properly identify the beginning and end of those time periods (step 29, FIG. 3A) when the communications protocol has authorized the user 12 to access the data link 18 (step 31, FIG. 3A) to transmit and/or listen for a burst communication.

Figure 2C:
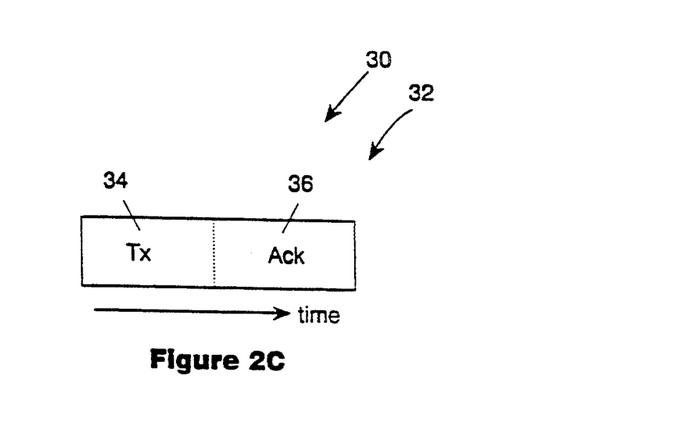
FIG. 2C illustrates a time period of the communications protocol reserved for user data communications.

Reference is now made to FIG. 2C wherein there is shown the division of a user time period (either primary or secondary, 30 or 32, respectively) within a frame 20 into a transmission ("Tx") period 34 followed by an acknowledgement ("Ack") period 36. Assuming that a user 12 has a message to transmit on the data link 18, the user will monitor the internal clock 22 keeping track of the protocol timing and access the data link at the first time period (a primary time period 30 if a primary user 14 or a secondary time period 32 if a secondary user 16) in the frame 20 authorized by the protocol for data transmission. At the beginning of an authorized time period, a transceiver ("Tx/Rx") 23 (FIG. 2) for the user 12 will access the data link 18 and transmit a burst communication (addressed to one or more intended recipient users) during the transmission period 34 (step 35, FIG. 3A). A plurality of users 12, including the intended recipient user, simultaneously access the data link 18 during the authorized time period 24 (using their transceivers 23) to listen for burst message transmissions. Following the completion of the burst transmission, the transmitting user 12 waits to receive an acknowledgement message addressed to the transmitting user from the intended recipient user during the acknowledgement period 36 of the same time period (step 37, FIG. 3A). If the intended recipient user 12 receives the transmitted message, it will transmit an acknowledgement message in period 36. As with the burst transmission, this acknowledgement will be received by all users accessing the data link 18 during the time period, but will be ignored by all except the transmitting user (addressor). When a user 12 has more than one message to initiate and transmit, the first message will be transmitted and acknowledged before any subsequent messages are transmitted. Thus, messages will not be duplicated, lost or arrive in an improper order. At the end of the authorized time period, the user will release access to the data link 18 and either (1) return to monitoring of protocol timing (FIG. 3A) for the remainder of the frame 20, or (2) if at the end of the frame, return to be synchronized with the other users to the communications protocol (FIG. 3A).

Simultaneous access to the data link 18 by multiple users 12 for listening purposes is acceptable. However, due to the large number of users 12 of the communications network 10, considerable competition for, and possibly simultaneous use of, individual time slots for initiating message transmissions on the data link 18 is inevitable and may cause communications problems on the network. When multiple transmitting users 12 access the data link 18 and simultaneously transmit data messages to identical or different intended recipient users, during the acknowledgement period 36 a transmitting user will either: (1) receive an acknowledgement message from the intended recipient user, (2) receive an acknowledgement message transmitted by a user other than the intended recipient user (indicating that one of the simultaneous message transmissions was received, but that the user's message transmission was not received by the intended recipient) or (3) not receive any acknowledgement message (indicating that none of the messages simultaneously transmitted by the multiple users were received by the intended recipient users). In the latter two cases each transmitting user 12 will assume that the transmitted message was lost due to simultaneous user access to, and initiation of message transmission on, the data link 18. A transmitting user 12 will then retransmit the message (step 43, FIG. 3B) in accordance with a message collision resolution scheme of the protocol in the transmit period 34 of the next similar type time period (either primary or secondary, 30 or 32, respectively, according to the type of user). If an acknowledgement is not heard in the next time period (step 45, FIG. 3B), then a subsequent randomly chosen time period in the future is selected by the user 12 for retransmission of the message (step 47, FIG. 3B). The selection of random time periods in the future will continue until either an acknowledgement is received (step 49, FIG. 3B) or a retry counter maintained by the user 12 expires (step 51, FIG. 3B). At that point, the user 12 will attempt to relay the message to the intended recipient by transmitting the message addressed to a different user, or transmit a message informing the network 10 of the message transmission failure (step 53, FIG. 3B).

Figure 3A:
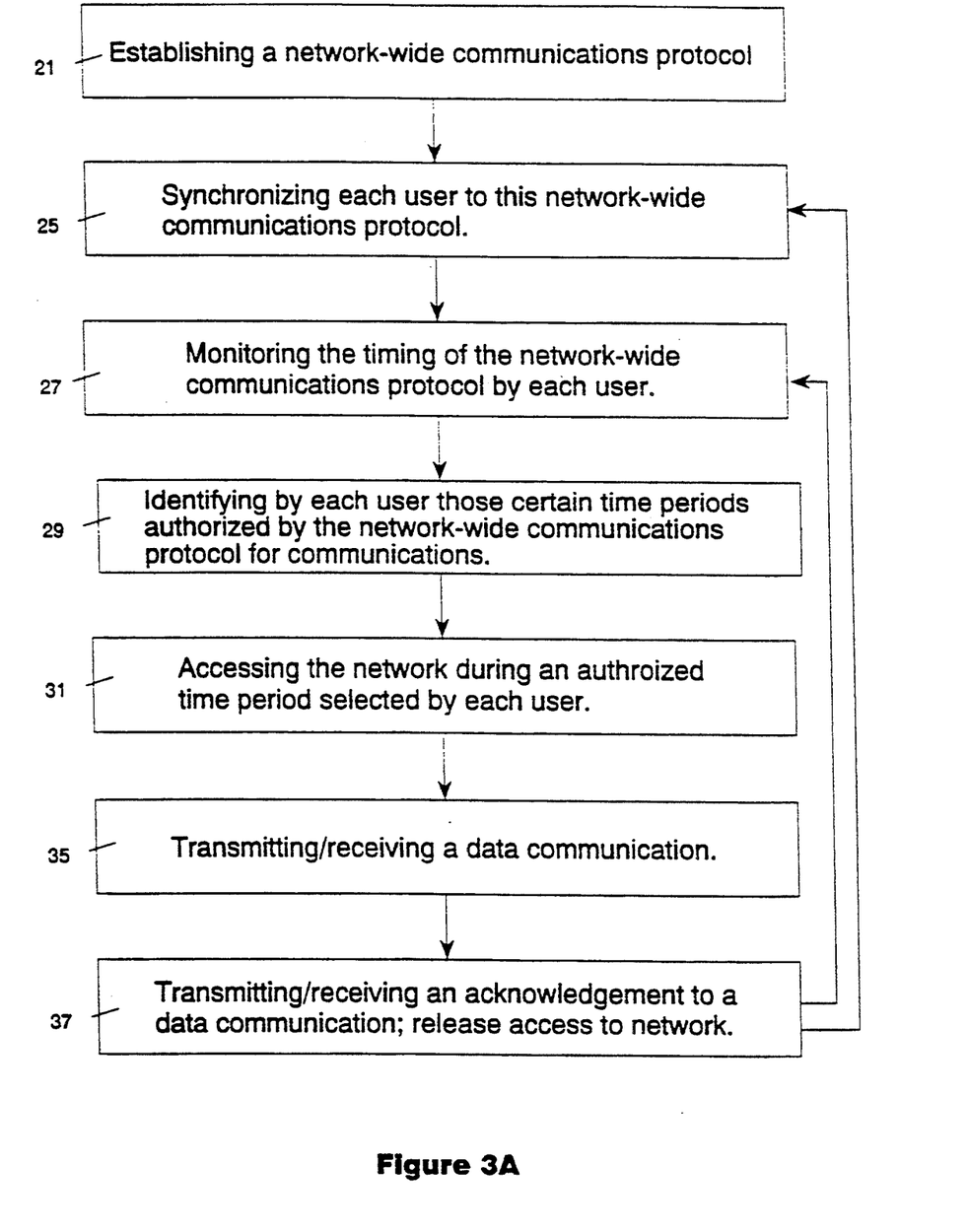
FIGS. 3A and 3B are flow diagrams illustrating the operation of the network according to the communications protocol.
Figure 3B:
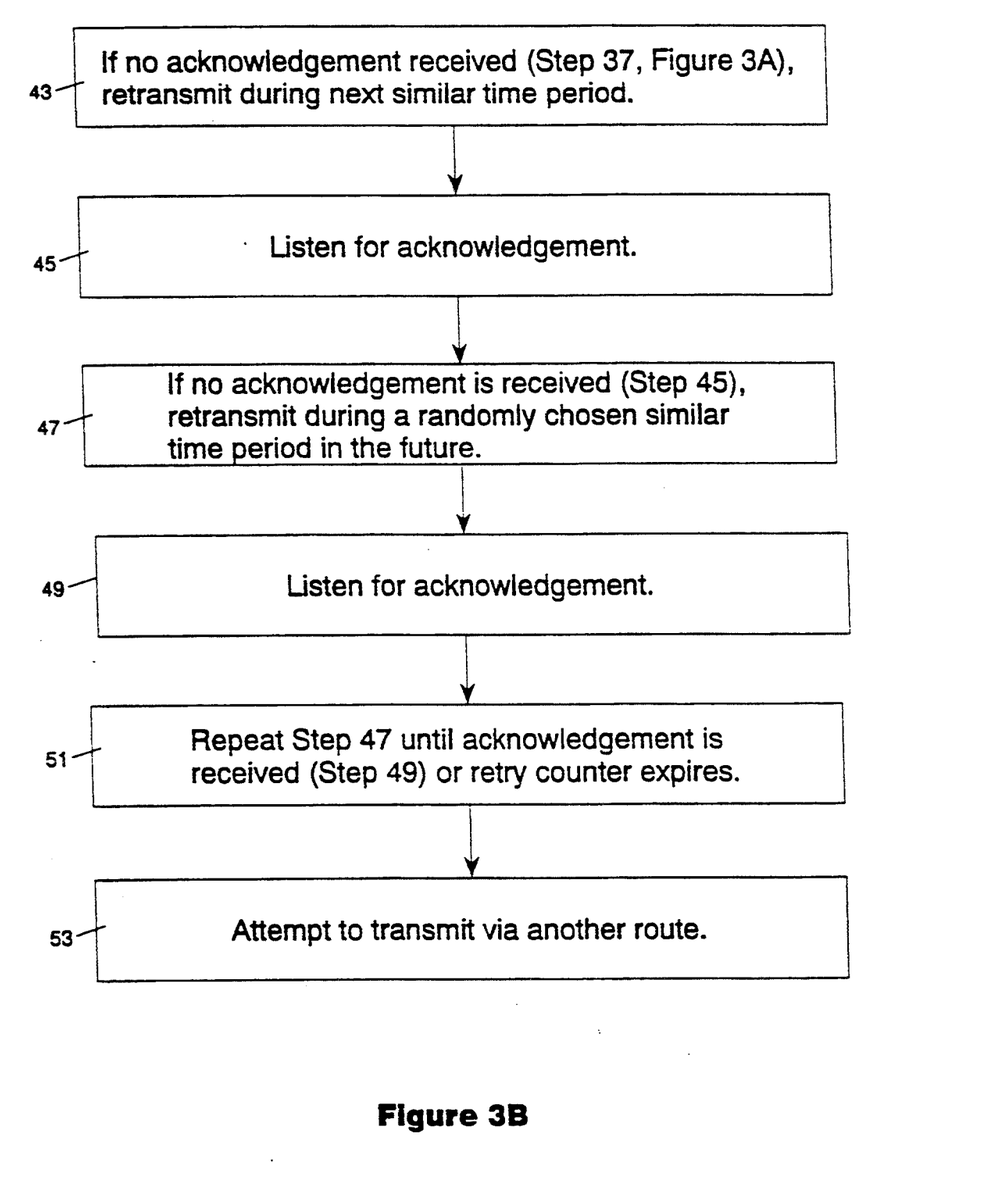

If a user 12 does not have a message to transmit on the data link 18, the user, according to the monitoring of the protocol timing by the internal clock 22, accesses the data link at the beginning of each time period authorized by the protocol for message transmissions (including the synch message) and listens for data messages addressed to the user as the intended recipient (step 35, FIG. 3A). For example, each primary and secondary user, 14 and 16, respectively, will access the data link 18 with the transceiver 23 and listen at the beginning of each primary time period 30 for communications initiated by a primary user. If no communication is detected for a predetermined amount of time in the transmission period 34, the user 12 will release access to the data link 18 and wait until the next primary time period 30 occurs to begin listening (or possibly initiate a transmission). If a communication addressed to the user 12 as intended recipient is detected, the user will transmit an acknowledgement message (if required) during acknowledgement period 36 of the same time period of transmission (step 37, FIG. 3A). Similarly, each primary user 14 will listen at the beginning of each secondary time period 32 for communications initiated by a secondary user 16. Furthermore, all users 12 will access the data link 18 during the synch time period 26 to listen for the synchronization message to update and synchronize their internal clock 22.

Figure 4:
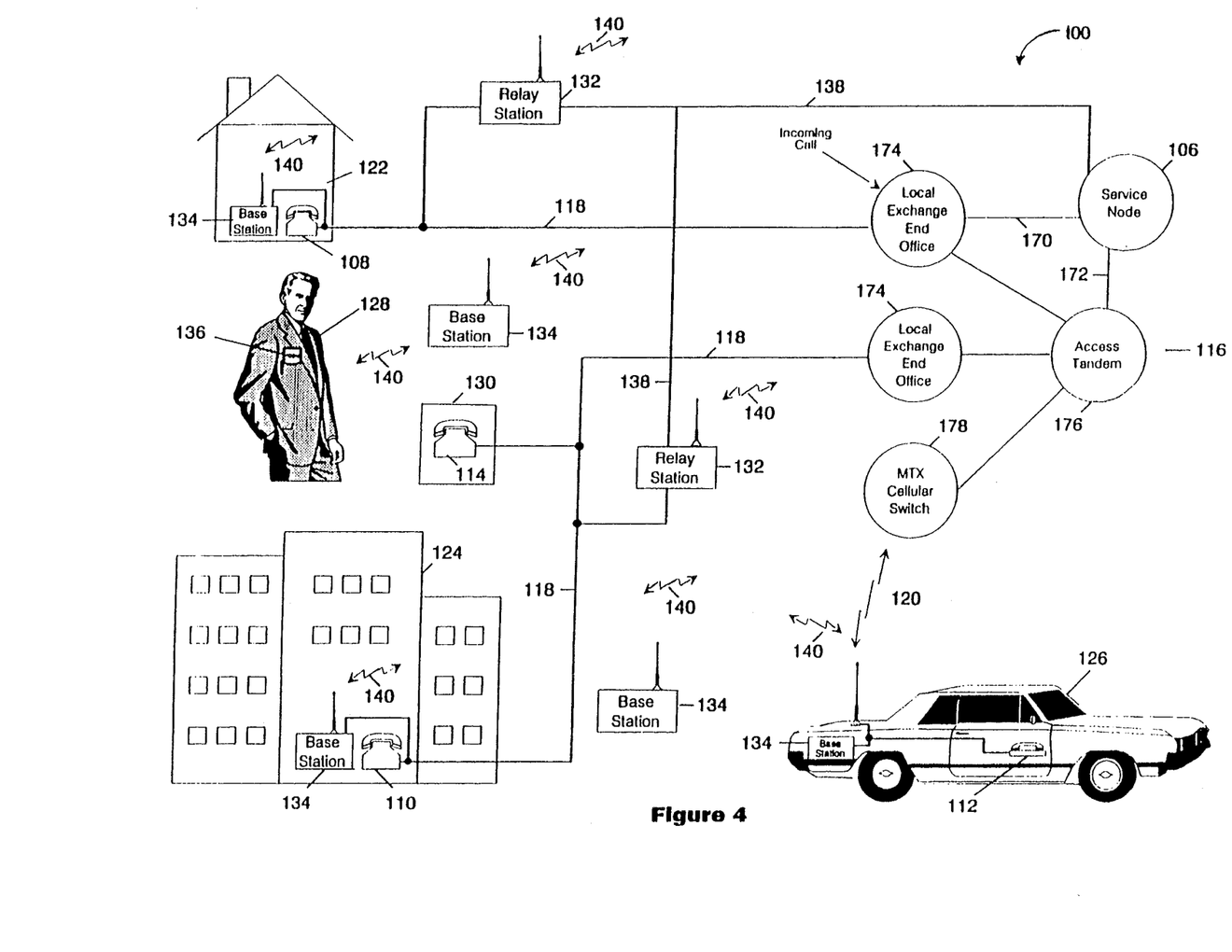
FIG. 4 is a block diagram for a personal telecommunications system utilizing the out-of-band bi-directional burst data communications network.

Referring now to FIG. 4, there is shown a block diagram of a personal telecommunications system for a service area 100 utilizing an in-band communications network for handling voice and data communications and an out-of-band data communications network (similar to the network 10 of FIG. 1) for handling burst data communications. The in-band communications network comprises a service node 106 connected to a plurality of telephones (108, 110, 112 and 114) by means of the existing public switched communications network 116, telephone lines 118 and cellular communications link 120. The telephones 108, 110 and 112 are located at the home 122, office 124 and automobile 126, respectively, for each subscriber 128 of the personal telecommunications service. The telephone 114 is a public access (pay) phone or other phone located at an area 130 frequented by the subscriber 128 or at any other location proximate to the current location of the subscriber.

The out-of-band communications network comprises the dedicated service node 106 in communication with a plurality of relay stations 132, base stations 134 and personal communicators 136 distributed about the service area 100. Each subscriber 128 is assigned a personal communicator 136 for communicating with the service node 106. The relay stations 132 are hardwire connected by a wire line data link 138 to the dedicated service node 106. The base stations 134 are distributed throughout the service area 100 and are particularly located at or near primary locations (such as home 122, office 124 and automobile 126) or frequented areas 130 designated by each subscriber 128. The personal communicator 136 communicates with the service node 106 primarily via nearby base stations 134 through a wireless data link 140. The communications are relayed to the service node 106 via the wireless data link 140 and the wire line data link 138 by the base stations 134 and relay stations 132. The personal communicators 136 may also communicate via the data link 140 directly with the relay stations 132 if necessary. The relay stations 132 and base stations 134 are connected, for backup purposes, to the telephone line 118 (or cellular link 120) to enable the relay stations and base stations to contact and communicate with the service node 106 via the public switched network 116 in the event to the out-of-band communications network fails.

The service node 106 is an intelligent network platform that is the central hub for both the in-band and out-of-band communications networks. The service node 106 contains equipment for receiving, originating and routing voice communications to and from the in-band communications network, for receiving, originating and routing data communications to and from the out-of-band communications network and for providing interactive voice and data communications feature management for subscribers 128 in a manner to be described. U.S. Pat. Nos. 4,903,263, 4,853,955, 4,782,519, and 5,086,461 disclose the hardware implementation of the service node 106.

Reference is again made to FIG. 1, in conjunction with FIG. 4, for an explanation of the similarities between the data communications network 10 and the out-of-band data communications network. The users 12 of the communications network 10 compare to the relay stations 132, base stations 134 and personal communicators 136 of the out-of-band Communications network. The primary users 14 are the relay stations 132 and base stations 134, and the secondary users 16 are the personal communicators 136. The data link 18 is equivalent to the wireless data link 140. The synch source 28 comprises the relay stations 132 and base stations 134 under control of the service node 106 via wire line data link 138. The wireless data link 140 employs the same multiple access communications protocol as the data link 18 to control user access to the data link and resolve instances of message collisions resulting from simultaneous message transmissions.

Figure 5A:
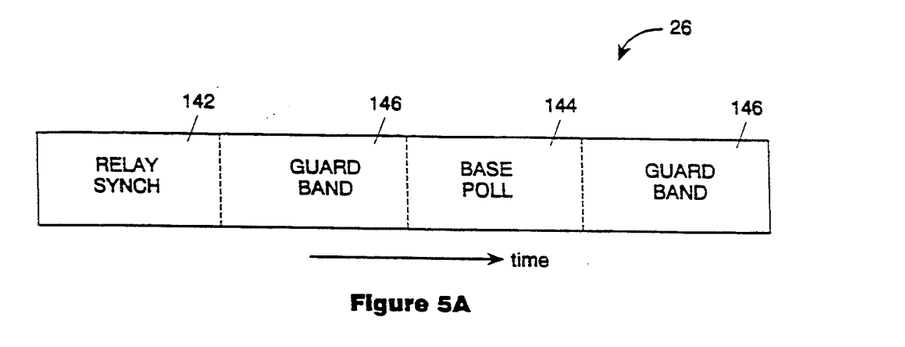
FIG. 5A illustrates the synchronization time period within each time frame of the communications protocol.

Reference is now made FIG. 5A wherein there is shown the partitioning of the synch time period 26

(FIG. 2B) into a relay station synch period 142 accessed by a predetermined relay station 132 to transmit a synch message, a base station poll period 144 accessed by a predetermined base station 134 to transmit a poll message, and two guard bands 146. The relay stations 132 alternate synch message transmission such that each relay station transmits a synch message in period 142 once every "x" frames 20, where "x" is the number of relay stations in the area 100. Similarly, the base stations 134 alternate transmitting poll messages such that each base station transmits a poll message in period 144 once every "y" frames 20, where "y" is the number of base stations in the area 100. One synch message and one poll message will be transmitted by the designated relay station 132 and base station 134 in each synch time period 142. A user will not necessarily receive a synch or poll message each frame.

The service node 106 periodically synchronizes each relay station 132 by transmitting a synch message over wire line data link 138. Each relay station 132 then synchronizes all base stations 134 (and possibly personal communicators 136) within transmission range by transmitting a synch message in the relay station synch period 142 of the synch time period 26. The base stations 134 synchronize all personal communicators 136 within transmission range by transmitting a poll message in the base station poll period 144 of the synch time period 26. The relay stations 132, base stations 134 and personal communicators 136 each maintain an internal clock that is monitored to keep track of the frames 20 of the protocol. The clock is adjusted by each received synch and/or poll message and synchronized with all other clocks maintained by the users of the network to within one-half millisecond. Synchronization on the out-of-band network of each user is intended to insure that users will access the data link 140 only during authorized time periods.

Each personal communicator 136 listens at each synch time period 26, not only to get synchronized with the out-of-band network by means of the synch and/or poll messages, but also to identify all proximately located base stations 134 from the received poll messages. The two base stations 134 with the highest number of poll messages received are identified as closest to the personal communicator 136 and are chosen as the primary and secondary message routers on the out-of-band network. Alternatively, the personal communicator 136 identifies the primary and secondary message router by measuring the signal strength of the poll messages received. Each personal communicator 136 maintains a record that is also maintained by the service node 106 of the identification numbers of all base stations 134 to which the personal communicator is assigned (for example, the special base stations at the home 122, office 124 or automobile 126 of the subscriber 128). If a poll message of one of these special base stations 134 is received a sufficient number of times and/or at above a predetermined signal strength, then the personal communicator 136 will choose that base station as the primary message router on the network. The choice of a special base station as a primary router for out-of-band communications affects the routing and handling of in-band voice communications because the service node 106 will identify the subscriber 128 as present at a location associated with the special base station chosen as primary router and route all in-band voice communications to the telephone at that location.

The base station poll messages are also used by the out-of-band network through the personal communicator 136 to monitor and track the location of the subscriber within the area 100. As the subscriber 128 and assigned personal communicator 136 move about the area 100, the personal communicator will hear poll messages from different base stations 134 and keep track of the changes in number of poll messages heard and strength of the poll message signals. When a change of primary and secondary base message routers occurs due to changes in poll message numbers or signal strength, the personal communicator 136 will signal the service node 106 of the change via the out-of-band network. The primary and secondary message routers for each personal communicator 136 in the area 100 are stored in a message routing look-up table in the service node 106 (along with the record of assigned base stations 134) linked to a unique subscriber-personal communicator identification number and updated with each communication from the personal communicator. When communications (either data or voice) with the subscriber are necessitated, the message routing information is accessed by the service node 106 to facilitate the routing of both data messages (via the out-of-band network) and voice messages (via the in-band network) in a manner to be described.

Figure 5B:
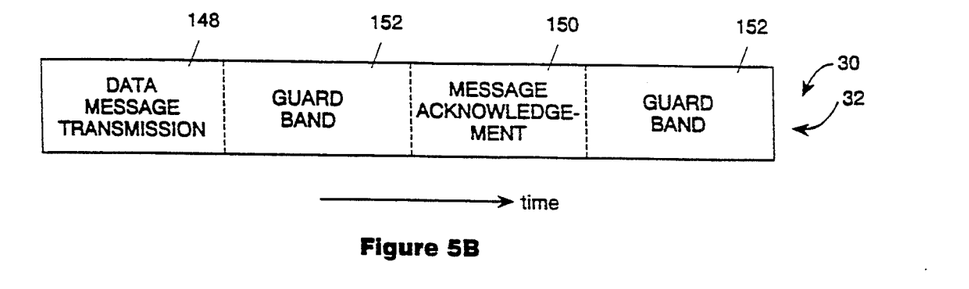
FIG. 5B illustrates one relay-base station and/or personal communicator data communications time period within the frame of the communications protocol.

Reference is now made to FIG. 5B wherein there is shown the partitioning of the primary time period 30 (FIG. 2B) and secondary time period 32 into a data transmission period 148, an acknowledgement period 150 and two guard bands 152. The primary time period 30 is used by the relay stations 132 and base stations 134 for transmitting data messages in period 148 (and receiving acknowledgements in period 150) over the channel 140. The intended recipients of such messages are other relay stations 132, base stations 134 and personal communicators 136. The secondary time period 32 is used by personal communicators 136 for transmitting messages in period 148 to base stations 134 (and receiving acknowledgements therefrom in period 150) over the channel 140. It will, of course, be understood that these time periods are used by intended recipients of the communications to listen and receive the message and transmit an appropriate acknowledgement.

Figure 5C:
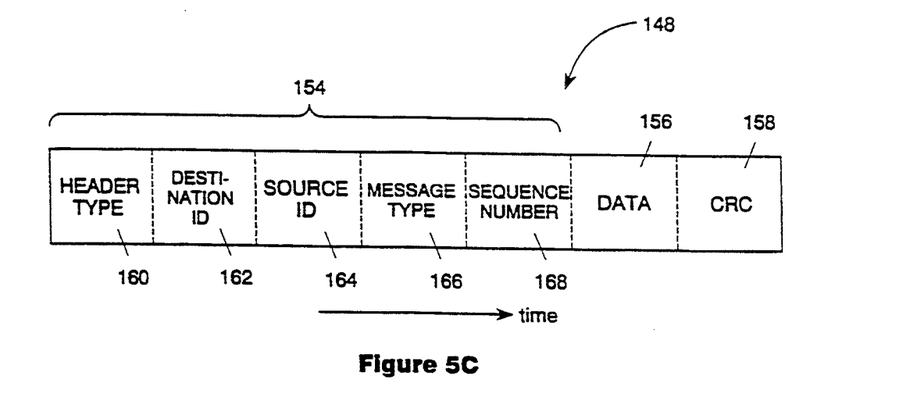
FIG. 5C illustrates the format for a data message transmitted by a relay station, base station or personal communicator.

The format for the data message transmitted in data transmission period 148 is shown in FIG. 5C and comprises a header 154 (divided into five fields), a data message 156 and a cyclic redundancy check ("CRC") 158. The first field of the header 154 is header type 160 that identifies for the relay stations 132, base stations 134 and personal communicators 136 the type of user that is the intended recipient of the data message. Thus, a data message intended for a base station 134 can be ignored by relay stations 132 and personal communicators 136 after receiving the header type 160. The second field is the destination identification number 162 of the relay station 132, base station 134 or personal communicator 136 that is the intended recipient of the message. The next field is the source identification number 164 of the relay station 132, base station 134 or personal communicator 136 that transmitted the message. The source identification is necessary so that the recipient will know where to send the acknowledgement message. The fourth field is the message type 166 that identifies the format of the data message 156 and also the final intended recipient if the recipient identified by the destination ID member is to relay the data message to another user. The final field is the sequence number 168 of the message used for timing and tracking of message transmissions.

Data transmissions on the network are point-to-point transmissions and point-to-multipoint transmissions. For example, to transmit a point-to-point message from a personal communicator 136 to the service node 106 requires at least three message transmissions. The first transmission is over the wireless data link 140 from the personal communicator to the base station 134 identified as the primary message router. If the primary message router does not acknowledge the message, the personal communicator will retransmit according to the collision resolution scheme of the protocol and if necessary route the message through the base station 134 identified as the secondary message router. The second transmission is also over the wireless data link 140 from the base station 134 to the relay station 132. The same message, acknowledgement and collision resolution rules of the protocol apply. The third transmission is over the wire line data link 138 from the relay station 132 to the service node 106 and not necessarily regulated by the protocol. A point-to-multipoint transmission will be a synch or poll message, or a network management transmission, that is sent to multiple user destinations from a single source.

Referring again to FIG. 4, the personal telecommunications system provides each subscriber 128 with comprehensive voice and data communications services regardless of subscriber location through the dialing of a single personal directory telephone number. The service node 106 uses trunk connections 170 and 172 to interface with the in-band communications network. Incoming calls on the in-band network dialed to the personal telephone number of a subscriber 128 are directed by a local exchange end office 174 via trunk line 170 to the system service node 106. Trunk line 170 is a direct inward dial (DID)/direct outward dial (DOD) trunk line and/or feature group B, feature group D, SS7 or similar facilities trunk that provides an in-band voice or data path for routing incoming calls to the service node 106 and a directory personal telephone number for each subscriber 128. The service node 106 will provide audible ringback to the caller and provide answer indication on all incoming calls dialed to subscriber personal telephone numbers.

When the incoming call reaches the service node 106, the primary and secondary message routers for the subscriber 128 are retrieved from the look-up table and used to route, via the out-of-band network, a call alert message to the personal communicator 136 carried by the subscriber. The directory telephone number for a telephone proximate to the subscriber, if known, is also retrieved from the look-up table in the service node 106. Such telephone numbers are stored in the look-up table for telephones at certain locations frequented by the subscriber (for example, the numbers for the telephones at the home, office and automobile of each subscriber), or are telephone numbers for telephones at the current location of the subscriber received by the service node from a message transmitted via the out-of-band network. Trunk lines 170 and 172 are accessed by the service node 106 according to the retrieved directory telephone number to redirect (route) the incoming call back through the in-band network to the subscriber utilizing an access tandem 176 and local exchange end office 174 or MTX cellular switch 178 within the public switched network 116. The trunk line 170 may also be used by the service node 106 to route an incoming call out directly to its associated local exchange end office 174 to bypass the access tandem 176.

If the subscriber either does not want to answer the incoming call or the service node 106 cannot route the call to the subscriber because the subscriber is not proximate to a telephone to receive the call or a telephone number for routing is unknown, the subscriber 128 may exercise remote control over the handling of the call by the service node 106 using the personal communicator 136. In response to the call alert message transmitted to the subscriber personal communicator 136, the subscriber 128 may transmit a message via the out-of-band network to the service node 106 to place the incoming call on hold until the subscriber reaches a telephone and signals the service node, again using the out-of-band network, to transfer the call to a proximate telephone. Alternatively, the subscriber 128 may direct the service node 106 to take a message. The subscriber may also use the out-of-band network to initiate a communication over the in-band network by accessing the service node 106 and directing the placing of a call. Other subscriber options are for controlling the operation of the service node 106 are disclosed in commonly assigned, co-pending U.S. application for patent Ser. No. 7/723,169 filed Jun. 28, 1991.

Figure 6:
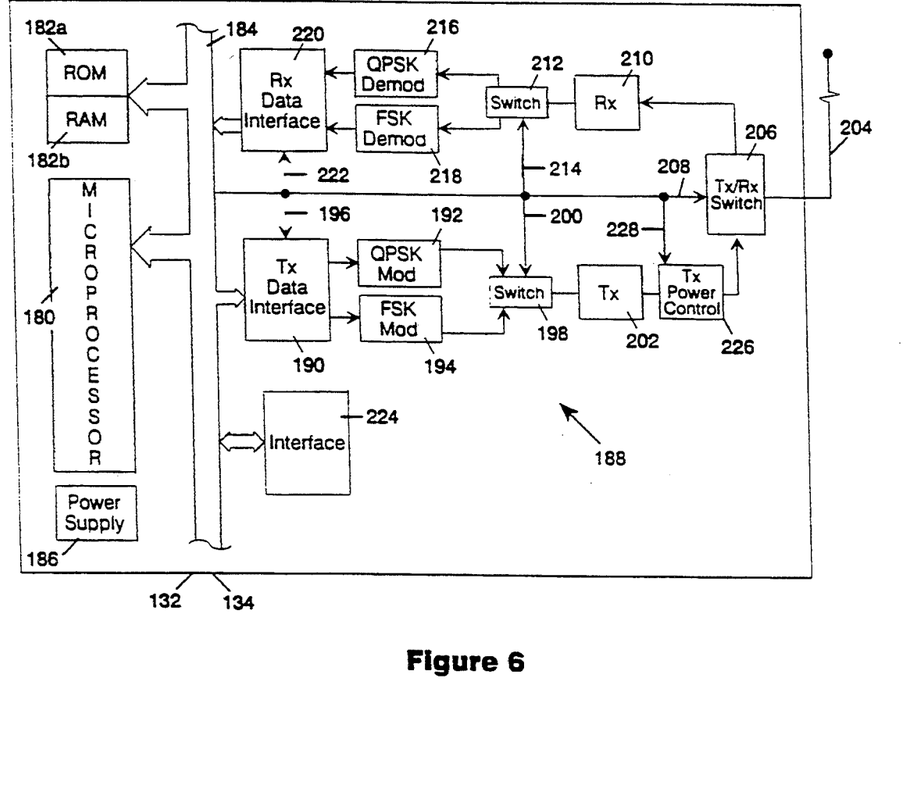
FIG. 6 is a block diagram for the base station and relay station utilized by the personal telecommunications system.

Referring now to FIG. 6, there is shown a block diagram of the relay station 132 and base station 134 utilized by the out-of-band communications network of the present invention. Although the relay stations 132 and base stations 134 utilize the same basic circuit design as shown, each operates in a different manner depending on an applications and functions program executed by an included microprocessor 180. The applications and functions program for the relay station-base station is stored in a read-only memory (ROM) 182a. A random-access memory (RAM) 182b is also included to provide a variable usage memory for temporary storage of applications program parameters, other data and subscriber network communications. Additional applications and functions programs are down loaded on the out-of-band network from the service node 106 when needed and stored in the RAM 182b. Data bus 184 couples the microprocessor 180 to the memory area 182. A power supply 186, receiving AC or DC power from an external input or a battery, supplies the regulated DC operating power for all components of the relay station and base station.

Communications on the wireless data link 140 between personal communicators 136 and base stations 134 rely on frequency shift keyed (FSK) modulation and communications on the wireless data link 140 between the base stations 134 and relay stations 132 rely on quadrature phase shift keyed (QPSK) modulation. The dual modulation scheme is employed on the out-of-band network because FSK modulation presents the most effective, cost effective and simplest modulation circuit to implement in the confines of the hand-held personal communicator 136. More advanced modulation schemes, such as QPSK, are used for relay station-base station transmissions because cost and circuit simplicity are not as important considerations. The relay station 132 and base station 134 are thus equipped to process both FSK and QPSK modulation.

To implement the dual use modulation schemes in a single transceiver, the relay station 132 and base station 134 design utilizes a dual modulator-demodulator (DMD) circuit 188. On the transmit side of the DMD circuit 188, a transmit interface 190 couples communications information either to a QPSK modulator 192 or an FSK modulator 194 according to a modulation selection signal received from the microprocessor 180 over line 196. The modulated information output from the QPSK and FSK modulators, 192 and 194, respectively, is applied to a switch 198. According to the modulation selection signal received by the switch 198 over line 200, the selected modulated signal is output to a transmitter circuit 202 where the signal is modulated with a carrier for broadcast by antenna 204 over the wireless data link 140 according to the multiple access communications protocol. A transmit-receive switch 206, controlled by a transmit-receive selection signal on line 208, properly couples the modulated information to the antenna 204.

On the receive side of the DMD circuit 188, the transmit-receive switch 206, under control of the transmit-receive selection signal on line 208, couples received burst communications to a receiver circuit 210 where the signal is downconverted to baseband for subsequent QPSK or FSK demodulation as needed. A switch 212, under the control the modulation selection signal received over line 214, couples the downconverted communication to the proper QPSK demodulation circuit 216 or FSK demodulation circuit 218. A receiver interface 220 couples the demodulated QPSK or FSK communication to the data bus 184 according to the modulation selection signal received from the microprocessor 180 over line 222.

An interface 224 is provided to enable the transmission of communications from the relay station 132 or base station 134 to occur over media other than the wireless data link 140. For example, both the relay station 132 and base station 134 are coupled for back-up purposes, in the event the out-of-band network fails, to the service node 106 by means of the telephone line 118 and the public switched network 116. In addition, the relay stations 132 are coupled by wire line data link 138 directly to the service node 106. The interface 224 provides the means for connecting the relay station 132 or base station 134 to the telephone line 118 and data link 138.

A transmitter power control 226 is provided to enable the microprocessor 180 to control the broadcast power of the communications transmitted by the antenna 328 on the wireless data link 140. The transmitter power control 226 receives the QPSK or FSK modulated communication and selectively controls the signal strength output according to an amplitude control signal received from the microprocessor 180 on line 228. Changing the broadcast power is required because base station 134 to personal communicator 136 transmissions do not necessarily need to propagate as far as base station to relay station 132 transmissions. Furthermore, by reducing the base station 134 broadcast power, the approximate distance of separation between a plurality of base stations and a particular personal communicator 136 (or between a mobile base station in a subscriber automobile 126 and a plurality of relay stations 132), and hence, the approximate location of the subscriber 128, may be determined from the strength of the received signal. Subscriber location may also be determined using known phase interferometer direction finding techniques wherein the phase difference between two antennas receiving a signal transmission provides an angle pointing to the location of the source of the transmission.

The microprocessor 180 maintains an internal clock that is initiated by the periodic reception of a synch message either from the service node 106 (if a relay station 132) or from a relay station (if a base station 134). The internal clock is accessed by the microprocessor 180 to determine when the microprocessor may transmit and receive messages over the wireless data link 140 according to the multiple access communications protocol. The microprocessor 180 further properly formats each message for transmission and decodes the format of each message received to identify if the relay station 132 or base station 134 is the intended recipient (and then generate and transmit an acknowledgement) and also determine whether the message needs to be forwarded on to another user of the network.

Figure 7:
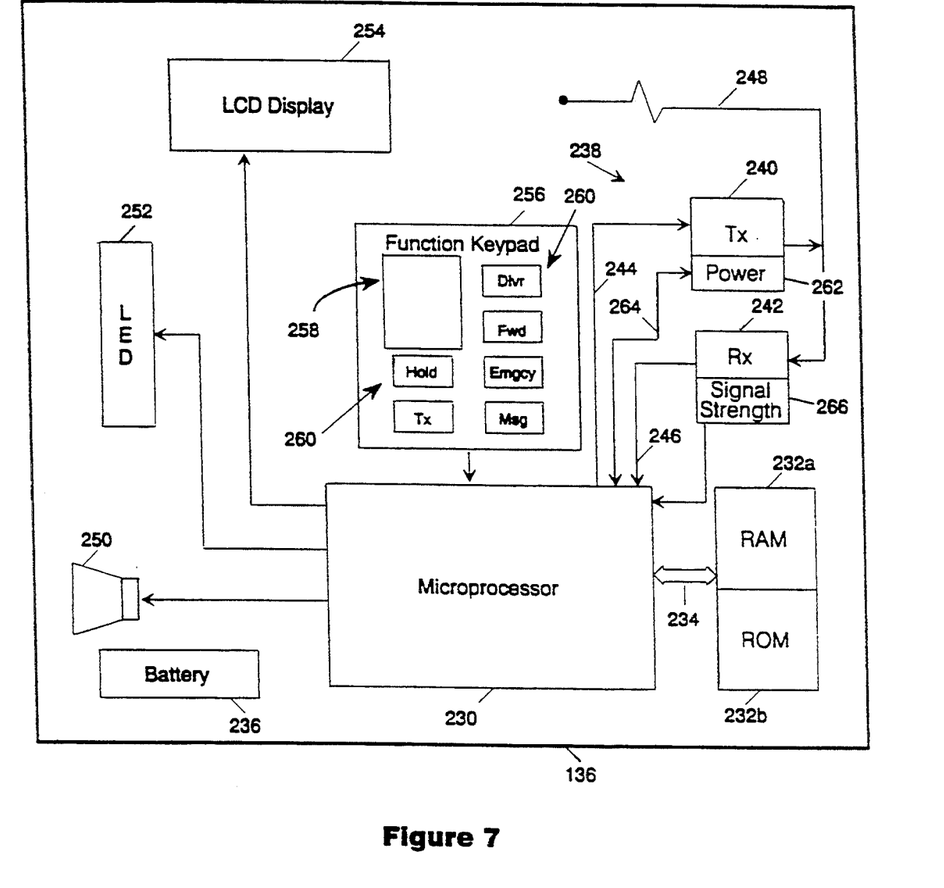
FIG. 7 is a block diagram for the personal communicator carried by each subscriber of the personal telecommunications system.

Referring now to FIG. 7, there is shown a block diagram for the personal communicator 136 carried by each subscriber 128. A dedicated microprocessor 230 handles all data processing functions of and directs all communications to and from the personal communicator 136 including executing an applications and functions program. The applications and functions program for the personal communicator 136 is stored in a read-only memory (ROM) 232a. A random-access memory (RAM) 232b is also included to provide a variable usage memory for temporary storage of applications program parameters, other data and subscriber communications messages. Additional applications and functions programs are down loaded on the out-of-band network from the service node 106 to the portable transceiver 136 when needed and stored in the RAM 232b. Data bus 234 couples the microprocessor 230 to the memory area 232. A battery 236 is also provided to power the components of the personal communicator 136.

The radio transceiver circuit 238 for the personal communicator 136 is comprised of a transmitter circuit 240 and receiver circuit 242 connected to the microprocessor 230 via lines 244 and 246, respectively, for message transmission and reception using an internal antenna 248. The transmitter and receiver, 240 and 242, respectively, each include a modulation and demodulation circuit. In the preferred embodiment, a frequency shift keyed (FSK) modulation scheme is employed to handle communications between the personal communicator 136 and the base stations 134 of the out-of-band network.

Also connected to the microprocessor 230 are three output devices; a speaker 250, an LED display 252 and an LCD character display 254. These output devices enable the personal communicator 136 to notify the subscriber of a call alert message transmitted over the network when an incoming phone call to the personal telephone number of the subscriber 128 is received by the service node 106. Other types of messages may also be transmitted to the subscriber 128 via the personal communicator 136. The speaker 250 and LED display 252 provide audible and visual notice of the receipt of a message from the service node 106 while the LCD display 254 provides written text of message for subscriber review.

A function keypad 256 is provided to input data into the microprocessor 230. The function keypad 256 includes an alphanumeric keypad 258 and a number of special purpose keys 260. With the function keypad 256, the subscriber may initiate a message transmission using the wireless and wire line data links, 140 and 138, respectively, to the service node 106, or transmit messages to relay stations 132 or base stations 134 as required.

The alphanumeric keypad enables the subscriber 128 to enter a text message for transmission onto the out-of-band network and delivery to the service node 106 and/or another portable communicator 136. The subscriber 128 may also enter the directory telephone number of a proximately located telephone via the alphanumeric keypad 258 for transmission to and storage in the service node 106. The special purpose keys 260 are programmed to perform specific system or user defined operations, for example, transmit a message, access the service node, signal an emergency, forward an incoming telephone call, place a caller on hold or take a message. Other functions are available or may be programmed for particular subscriber requests. The subscriber 128 thus executes complete control, independent of location, via the out-of-band network of voice communications on the in-band network.

The microprocessor 230 maintains an internal clock that is initiated by the periodic reception of a synch message from a relay station 132 or a poll message from a base station 134. The internal clock is monitored by the microprocessor 230 to determine when the microprocessor may transmit and receive messages over the wireless data link 140 according to the multiple access communications protocol. Knowledge of the timing of the protocol enables the microprocessor 230 to conserve the limited power supplied by the battery 236. The personal communicator 136 only listens for a message transmission at the beginning of each time period reserved for communicator message reception. If the beginning of a message is not heard within a predetermined time, the personal communicator 136 goes back to "sleep" until the next time period reserved for personal communicator message reception occurs.

The microprocessor 230 further properly formats each message for transmission and decodes the format of each message received to identify if the personal communicator is the intended recipient of the message. The microprocessor also tracks the received poll messages to update the location of the subscriber and generates the proper messages for automatic transmission to the service node 106 over the out-of-band network providing information regarding subscriber location changes. A transmitter power control 262 is provided to enable the microprocessor 230 to control the broadcast power of the communications transmitted by the antenna 248 on the wireless data link 140. The transmitter power control 262 receives the FSK modulated communication and selectively controls the signal strength output according to an amplitude control signal received from the microprocessor 230 on line 264. By changing the personal communicator 136 broadcast power, the approximate distance of separation between the personal communicator and a particular base station 134 may be determined as a means for approximating the location of the subscriber 128. Such location finding may be enhanced through use of the phase interferometer direction finding technique described earlier. The receiver circuit 242 also includes a signal strength measuring means 266 used to measure the strength of the poll messages from the base station 134 to identify the primary and secondary routers.

Although a preferred embodiment of the out-of-band bi-directional burst communications network of the present invention for a personal telecommunications system has been illustrated in the accompanying Drawings and described in the foregoing Detailed Description, it will be understood that the invention is not limited to the embodiment disclosed, but is capable of numerous rearrangements, substitutions and modifications without departing from the spirit of the invention.

I claim:

1. A method for sharing access to a single channel, bi-directional data link for communications between a plurality of primary users and a plurality of secondary users comprising the steps of:

establishing a repeating time frame, each frame therein including a plurality of primary and secondary time periods therein;

synchronizing each user to the repeating time frame;

identifying by each primary and secondary user the plurality of primary and secondary time periods, respectively, in each frame as authorized time periods for that user to access said single channel, bi-directional data link and initiate a communication;

accessing said single channel, bi-directional data link by said primary users to initiate a communication with at least one secondary user only during said primary time periods; and accessing the single channel, bi-directional data link by said secondary users to initiate a communication with at least one primary user only during said secondary time periods.

2. The method as in claim 1 wherein the steps of accessing include the steps of:

transmitting a data message on the single channel, bi-directional data link to a predetermined user recipient during the accessed authorized time period; and listening for an acknowledgement of receipt of the data message from the predetermined user recipient during the accessed authorized time period.

3. The method as in claim 2 further including the steps of:

accessing the single channel, bi-directional data link during the next authorized time period if an acknowledgement from the predetermined user recipient during the previously accessed time period is not received;

retransmitting the data message on the single channel, bi-directional data link to the predetermined user recipient; and listening for an acknowledgement of receipt of the data message from the predetermined user recipient.

4. The method as in claim 2 further including the steps of:

accessing the single channel, bi-directional data link during a randomly selected authorized time period in the future if an acknowledgement from the predetermined user recipient is not received;

retransmitting the data message on the single channel, bi-directional data link to the predetermined user recipient; and listening for an acknowledgement of receipt of the data message from the predetermined user recipient.

5. The method as in claim 4 further including the steps of:

repeating the steps of claim 4 for a user selected number of times until an acknowledgement of receipt of the transmitted data message is received; and transmitting the data message via user selected alternative means after repeating the steps of claim 4 for a user selected number of times.

6. The method as in claim 1 wherein the repeating time frame further includes synchronization time periods and wherein the step of synchronizing comprises the steps of:
- accessing the single channel, bi-directional data link during one of the synchronization time periods;
- listening for a synchronization message on the single channel, bi-directional data link; and
- updating user synchronization to the repeating time frame according to the received synchronization message.

7. A communications network, comprising:
- a single channel, bi-directional communications data link accessed according to a repeating time frame including a plurality of primary and secondary time periods therein;
- a plurality of primary network users and a plurality of secondary network users selectively accessing said single channel, bi-directional communications data link to communicate between each other, wherein each primary and secondary user comprises:
  - clock means for timing said repeating time frame; and
  - transceiver means responsive to said clock means for identifying said plurality of primary and secondary time periods and for accessing said single channels, bi-directional communications data link during a selected one of said primary time periods to initiate a communication with at least one secondary user if the network user is a primary network user and for accessing said single channel, bi-directional communications data link during a selected one of said secondary time periods to initiate a communication with at least one primary user if the network user is a secondary network user; and
- means coupled to said single channel, bi-directional communications data link for transmitting a synchronization message to synchronize the clock means of each primary and secondary network user to the repeating time frame.

8. The communications network as in claim 7 wherein the single channel, bi-directional communications data link comprises a wireless radio frequency link and the transceiver means comprises a radio frequency transceiver.

9. The communications network as in claim 7 wherein the transceiver means comprises:
- means for transmitting a data message on the single channel, bi-directional communications data link to a predetermined user recipient during the selected time period; and
- means for listening for an acknowledgement of receipt of the data message from the predetermined user recipient during the selected time period.

10. The communications network as in claim 9 wherein the transceiver means further comprises:
- means for retransmitting the data message on the single channel, bi-directional communications data link during the next time period if an acknowledgement from the predetermined user recipient during the selected time period is not received; and
- means for listening for an acknowledgement of receipt of the data message from the predetermined user recipient during the next time period.

11. The communications network as in claim 9 wherein the transceiver means further comprises means for retransmitting the data message and listening for an acknowledgement of receipt from the predetermined user recipient during a randomly selected time period in the future if an acknowledgement from the predetermined user recipient during the selected time period is not received.

12. A communications system, comprising:
- a telephonic communications network including means for providing in-band communications service to a plurality of subscribers;
- a command communications network comprised of a plurality of user transceivers including means for providing out-of-band communications service to the plurality of subscribers via the user transceivers wherein at least one user transceiver is assigned to each subscriber;
- a central communications control means connected to the telephonic and command communications networks including means responsive to out-of band communications from a subscriber over the command communications network for controlling the manner with which the in-band communications service is provided to that subscriber over the telephonic communications network; and
- wherein the plurality of user transceivers include a secondary transceiver assigned to each subscriber and at least one primary transceiver for relaying communications between the control means and the secondary transceivers over the command communications network.

13. The communications system as in claim 12 wherein each of the plurality of user transceivers on the command communications network includes protocol means for controlling user transceiver access to the command communications network for engaging in out-of-band communications.

14. The communications system as in claim 13 wherein the protocol means comprises:
- clock means synchronized to a repeating time frame including a plurality of time periods therein;
- processing means responsive to the clock means for identifying at least one time period in each time frame as an authorized time period for a user transceiver to engage in out-of-band communications; and
- transceiver means connected to the processing means for accessing the command communications network during a selected one of the identified authorized time periods for engaging in out-of-band communications over the command communications network.

15. The communications system as in claim 14 wherein the protocol means further includes means for resolving simultaneous communication conflict between multiple user transceivers accessing the command communications network during the same authorized time period.

16. The communications system as in claim 12 wherein said command communications network includes a data link interconnecting the plurality of user transceivers to the control means and wherein the control means further includes means for synchronizing each user transceiver to control user transceiver access to the data link.

17. The communications system as in claim 16 wherein the means for synchronizing comprises:
- means for broadcasting a synchronization signal on the data link to each user transceiver;

clock means for each user transceiver synchronized by the synchronization signal to a repeating time frame wherein each time frame comprises a plurality of communications time periods; and processing means within each user transceiver responsive to the clock means for identifying certain ones of the plurality of time periods in each time frame as authorized for user transceiver access to the data link.

18. The communications system as in claim 17 wherein each user transceiver further includes transceiver means connected to the processing means for accessing the data link during a selected authorized time period.

19. The communications system as in claim 17 wherein the processing means of each user transceiver further includes means for resolving instances of simultaneous transmission of data communications on the data link by multiple user transceivers during the same time period.

* * * * *